Figure 2:
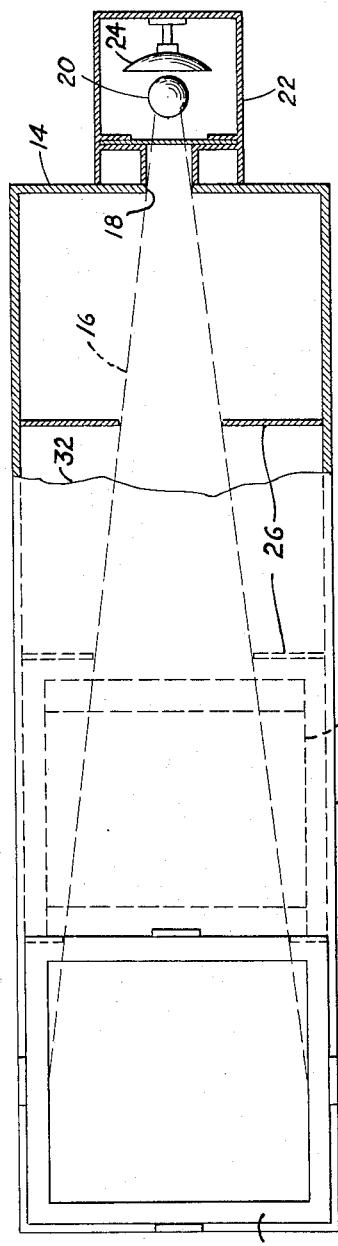

Oct. 25, 1960  F. E. WATTIER  2,957,399
PHOTOGRAPHIC DEVICE
Filed Oct. 1, 1959

INVENTOR
Francis E. Wattier
BY Morgan, Finnegan,
Durham & Pine
ATTORNEYS

United States Patent Office 2,957,399
Patented Oct. 25, 1960

2,957,399

PHOTOGRAPHIC DEVICE

Francis E. Wattier, New York, N.Y.

Filed Oct. 1, 1959, Ser. No. 843,815

9 Claims. (Cl. 95—73)

This invention relates generally to photographic apparatus for producing contact type photographic reproductions which may in turn be employed in the production of printing cylinders or plates by etching or for any other desired purpose and the invention has particular relation to such a photographic apparatus wherein the light source for producing the contact reproduction is in the form of a diverging beam that impinges upon an obliquely disposed first surface reflector and directed laterally upon the sensitized material upon which the reproduction is made.

Objects and advantages of the invention will be obvious herefrom, or may be learned by practice with the invention, the same being realized and attained by means of the instrumentalities and combinations pointed out in the appended claims.

The present invention has for its object an improved photographic apparatus for producing contact type photographic reproductions and wherein the light source is a diverging beam of light reflected laterally upon a sensitized material by means of a first surface reflector obliquely disposed with respect to the beam of light. A further object is the provision of such an apparatus wherein the intensity of the reflected beam directed toward the photosensitive material is of uniform intensity throughout its transverse area. A still further object of the invention is the provision of such a photographic apparatus wherein the characteristic of the reflecting surface to reflect different amounts of light with varying incident angles is automatically compensated for in a simple and expeditious manner so as to give a reflected beam that is of uniform intensity throughout its area. Another object is the provision of such a photographic apparatus which is extremely simple and economic in its construction yet highly reliable in operation giving uniform and excellent results.

In accordance with the present invention there is provided a generally rectangular housing which has a light source mounted at one end with this source preferably being a tungsten filament lamp and which projects a diverging beam longitudinally of the housing. This diverging beam impinges upon a first surface reflector that is mounted in the housing obliquely of the beam so that the beam is reflected laterally through a suitable opening in the side wall of the housing for impingement upon a photosensitive material, there being a suitable holder supported on the side wall and immediately adjacent this opening for retaining the photosensitive material whether it be a film sheet, plate, or other material in position for exposure with a transparency that may be a positive or a negative retained in front of and in contact with the surface of this material. In order that the intensity of the reflected beam of light that is directed toward the photosensitive material will be uniform throughout its transverse area a transparent compensating plate is positioned in front of the first surface reflector in spaced relation with the reflector and so the diverging beam directed from the light source to the reflector passes through this plate. This plate has a characteristic with regard to the transmission of light throughout the transverse area of the beam which is opposite of the characteristic of the first surface reflector with regard to the reflecting of the light throughout the transverse area of the beam. A first surface reflector has the characteristic of reflecting a greater amount of light as the angle of incidence of the light rays with respect to the reflector is decreased. Thus with an angle of incidence of 45° a greater amount of light is reflected by the reflector than with an angle of incidence of 65° and contrariwise a lesser amount of light is reflected than with an angle of incidence of 25°. It is for this reason that without the compensating plate of the invention, while the intensity of the diverging beam that strikes or impinges upon the first surface reflector is uniform throughout its transverse area the reflected beam itself is not uniform but has a substantial variation in light intensity from one side to the other. The compensating plate is a flat plate having parallel sides and is preferable arranged generally parallel to the reflecting surface of the reflector being spaced sufficiently so that the reflected beam does not intersect the plate. The plate is of a sufficient optical density so that the variation in light transmission produced by the plate throughout the transverse area of the diverging beam is generally equal to and inverse of the corresponding variation in reflected light produced by the reflector so that the reflected beam is of uniform light intensity throughout its area.

The invention consists in the novel parts, constructions, arrangements, combinations and improvements herein shown and described.

The accompanying drawings, referred to herein and constituting a part hereof, illustrate one embodiment of the invention and together with the description, serve to explain the principles of the invention.

Figure 1:
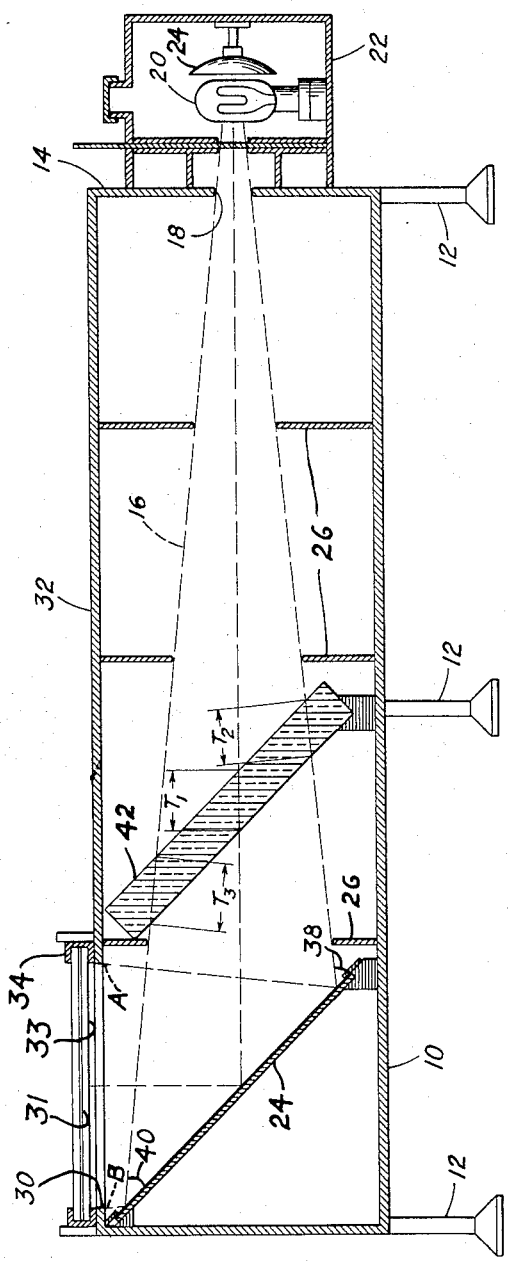

Figure 1 is a vertical sectional view of the photographic reproducing organization of the invention; and Figure 2 is a top view of this photographic reproducing apparatus, with this view being partially in section.

Referring now to the drawings, wherein like reference characters are used throughout to designate like elements, the illustrative and preferred embodiment of the invention as depicted in these drawings includes housing 10 which is horizontally elongated as shown and is mounted upon legs 12. Secured to end wall 14 of the housing is a suitable light source which is effective to direct a diverging beam of light 16 through opening 18 in this end wall and with this light source comprising a tungsten filament electric lamp 20 mounted in casing 22 which is secured to wall 14 and with reflector 24 being positioned immediately to the rear of the lamp to direct the beam forwardly as indicated.

In order to provide a sharply defined diverging light beam and to maintain stray and reflected light at a minimum there are mounted within housing 10 a number of spaced baffles 26 which are provided with progressively larger openings in the forward direction of the light beam as shown in the drawing and through which the light beam passes with the openings in these baffles being concentric with the light beam axis and serving to provide a sharp well defined beam of light.

The beam of light 16 impinges upon an obliquely arranged flat reflector 24 mounted within housing 10 at the end thereof remote from the light source, with the beam being reflected upwardly through opening 30 provided in the top 32 of the housing for impingement upon a sensitized material for photographic reproduction. The photosensitive material 31 is retained in place for exposure and over opening 30 by means of a suitable frame 34 which is mounted on the top 32 of housing 10. Positioned in front of this photosensitive material and in contact with the surface thereof is a suitable transparency 33 which may be a positive or a negative and which bears the image that is to be reproduced with this transparency also being mounted in frame 34.

In order to have a high quality reproduction it is necessary that the intensity of the reflected light beam be uniform throughout its transverse area.

In order to get maximum reflection as well as for other reasons the reflector 24 is a first surface reflector, i.e., the front surface is the reflecting surface, with this reflecting surface preferably being aluminum. It is a characteristic of flat first surface reflectors that the amount of light that is reflected varies with the angle of incidence of the light rays with respect to the reflecting surface. As the angle of incidence increases the amount of reflected light decreases.

In the organization of the invention reflector 24 is preferably mounted at an angle of about 45° with respect to the axis of light beam 16. Since this light beam is a diverging beam the incident light rays will vary with regard to their angle with respect to the reflecting surface throughout the area of the light beam. Accordingly, the angle of incidence at the bottom of the beam identified in Figure 1 as 38 is substantially greater than the angle of incidence at the top of the beam and identified as 40. Likewise the angle of incidence of the beam varies from side to side from the center of the beam outwardly toward each side with the angle decreasing from the center of the beam outwardly. If nothing is done to compensate for the effect of the variation in the amount of light reflected with a variation in the angle of incidence of the light with respect to the reflecting surface, the reflected beam will vary substantially in its intensity throughout the area of the beam. Illustrative of this variation, the light intensity at the right of the reflected beam, identified in Figure 1 as A, may be only 89% of the intensity at the left of the beam, and identified as B in the Figure 1 illustration. This will of course produce an uneven exposure of the photosensitive material 31 and in a test run employing a photosensitive material without a transparency 33 in front of it and with an exposure and a development such as to give an optical density of 1 (one) at the location B of the test sheet the density of the location A will be only .95.

In order to compensate for this effect produced by the first surface reflector a compensating plate 42 is positioned in front of the reflector as shown with this plate being spaced sufficiently from the reflector so that the reflected beam of light that is directed upwardly bypasses this plate. Plate 42 is preferably of glass and is a relatively accurately ground flat plate having parallel surfaces or sides. The plate is mounted with respect to the reflecting surface so that the variation in light adsorption transversely of the beam 16 that passes through the plate is substantially equal to and inverse of the variation in reflection of the reflecting surface. In the illustrative arrangement, plate 42 is parallel with the reflecting surface of reflector 24 and accordingly, the distance that the light of beam 16 must pass through in traversing the plate at the center thereof (T–1) is greater than the distance at T–2 but less than the distance at T–3 and accordingly the light adsorption of plate 42 with respect to beam 16 progressively increases vertically throughout the heighth of the beam as viewed in Figure 1. The light adsorption of plate 42 will also increase laterally of the beam from the center outwardly since the distance that the beam travels through the plate increases in this manner. It is thus seen that the light adsorption produced by plate 42 varies in the direct opposite sense of the variation of light reflection by the front surface reflector. Accordingly, by choosing the correct optical density for the compensating plate 42 this effect of the first surface reflector can be very accurately compensated for so that the reflected beam has a uniform intensity throughout its transverse area.

It has been found that with an aluminum reflector mounted at 45° with respect to the axis of light beam 16 and with the plate 42 being an accurately ground glass plate having an optical density of .20 optimum results are obtained with the reflected light beam being uniform throughout its area.

To illustrate the general size of the apparatus with which the invention is concerned housing 10 in a typical photographic reproducing organization is six feet long and twenty-six inches high with compensating plate 42 being one-quarter inch thick and disposed in parallel relation with the aluminized first surface reflector 24 which is mounted at an angle of 45° with respect to the axis of housing 10 and accordingly the axis of light beam 19. The size of the sensitized sheet or plate and the transparency mounted in contact with the surface thereof in such an illustrative installation is approximately sixteen by nineteen inches.

It is thus seen that with the organization of the invention the inherent characteristic of a first surface reflector to vary the intensity of the reflected light of a diverging beam impinging thereupon is compensated in an extremely simple yet very effective manner resulting in a photographic reproducing device which, while uncomplicated, is capable of producing very high quality work.

The invention in its broader aspects is not limited to the specific mechanism shown and described but departures may be made therefrom, within the scope of the accompanying claims, without departing from the principles of the invention and without sacrificing its chief advantages.

What is claimed is:

1. A photographic apparatus of the type described comprising means producing a diverging beam of light, a flat first surface reflector in the path of said beam and angularly disposed with respect to the axis thereof to reflect the beam laterally for impingement upon a sensitized material and means for compensating for variations in the intensity of the reflected beam transversely thereof due to variations of the angle of incidence of the diverging beam with respect to the reflector, said means comprising a transparent flat plate of substantial optical density having parallel sides, generally parallel with the surface of the reflector and disposed in front thereof in the path of the beam with said plate being spaced from the reflector so as to be out of the path of the reflected beam.

2. A photographic apparatus of the type described comprising means producing a diverging beam of light, a flat first surface reflector in the path of said beam and angularly disposed with respect to the axis thereof to reflect the beam laterally for impingement upon a sensitized material and means for compensating for variations in the intensity of the reflected beam transversely thereof due to variations of the angle of incidence of the diverging beam with respect to the reflector, said means comprising a transparent plate in the path of said beam with the optical density of the plate and the disposition thereof relative to the reflector being such that the variation in transmission laterally of the beam as it passes through the plate is substantially the same but inverse of the variation in reflection of the reflector transversely of the beam.

3. A photographic reproduction apparatus comprising a tungsten filament light source, means forming a diverging light beam from said source, a flat first surface reflector intersecting said beam and angularly disposed with relation thereto to reflect the beam laterally through a transparency and upon a photosensitive member for producing a reproduction, a transparent plate tinted blue to convert the tungsten light to daylight disposed in front of the reflector in the path of said beam with the optical density of the plate and the disposition thereof relative to the reflector being such that the variation in transmission laterally of the beam as it passes through the plate is substantially the same but inverse of the variation in reflection of the reflector transversely of the beam.

4. A photographic apparatus of the type described comprising means producing a diverging beam of light, a flat first surface reflector in the path of said beam and angularly disposed with respect to the axis thereof to reflect the beam laterally for impingement upon a sensitized material and means for compensating for variations in the intensity of the reflected beam transversely thereof due to variations of the angle of incidence of the diverging beam with respect to the reflector, said means comprising a transparent plate disposed in front of the reflector in the path of said beam impinging upon the reflector but out of the path of the reflected beam with the optical density of the plate and the disposition thereof relative to the reflector being such that the variation in transmission laterally of the beam as it passes through the plate is substantially the same but inverse of the variation in reflection of the reflector transversely of the beam.

5. A photographic apparatus of the type described comprising means producing a diverging beam of light, a flat first surface reflector having an aluminum reflecting surface disposed in the path of said beam and angularly arranged with respect to the axis thereof to reflect the beam laterally for impingement upon a sensitized material and means for compensating for variations in the intensity of the reflected beam transversely thereof due to variations of the angle of incidence of the diverging beam with respect to the reflector, said means comprising a flat transparent plate with parallel sides and having an optical density of about .20 with the plate being in the path of the beam, parallel with the reflecting surface of the reflector and spaced therefrom so the reflected beam bypasses the same.

6. A photographic reproduction apparatus comprising a tungsten filament light source, means forming a divergent beam from said source, a flat first surface reflector having an aluminum reflecting surface disposed in the path of said beam and angularly arranged with respect to the axis thereof to reflect the beam laterally for impingement upon a sensitized material for producing a reproduction, and means for compensating for variations in the intensity of the reflected beam transversely thereof due to variations of the angle of incidence of the diverging beam with respect to the reflector, said means comprising a flat glass plate having an optical density of .20, tinted blue to convert tungsten light to daylight and having parallel surfaces, said plate being disposed in the path of the beam in front of the reflector and parallel therewith the plate being spaced from the reflector so the reflected beam bypasses the same.

7. A photographic reproducing device comprising an elongated housing, a source of light projecting a beam longitudinally of the housing, successively arranged baffles in the housing forming a diverging beam of the light, a flat first surface reflector in said housing in the path of said beam and angularly disposed with respect to the beam axis to direct the beam laterally at a predetermined location for use for photographic reproduction, a flat transparent plate interposed between said reflector and said light source intersecting said beam with said plate being spaced from the reflector such that the reflected beam bypasses said plate, the optical density of the plate and the disposition thereof relative to the reflector being such that the variation in transmission laterally of the beam as it passes through the plate is subtsantially the same but inverse of the variation in reflection of the reflector transversely of the beam.

8. A photographic reproducing device comprising an elongated housing, a source of light projecting a beam longitudinally of the housing, successively arranged baffles in the housing forming a diverging beam of the light, a flat first surface reflector in said housing in the path of said beam and angularly disposed with respect to the beam axis to direct the beam laterally at a predetermined location for use for photographic reproduction, a flat glass plate having parallel surfaces and an optical density of about .20 interposed between the reflector and said light source, parallel with the reflector and spaced therefrom so the reflected beam bypasses the same.

9. A photographic reproducing device comprising a housing having a tungsten filament light source adjacent one end, baffles successively arranged in longitudinally spaced relation in the housnig and effective to form a diverging light beam from said source extending longitudinally of the housing, a first surface reflector having a flat aluminum reflecting surface mounted in the housing and disposed in the path of the beam at an angle of about 45° to the axis thereof to reflect the beam laterally at a predetermined location for use for photographic reproduction, a flat glass plate having parallel surfaces and tinted blue to convert tungsten light to daylight, said plate having an optical density of about .20 and mounted in the housing in the path of the beam and in parallel relation with the reflecting surface but spaced therefrom so the reflected beam bypasses the same.

No references cited.